HORIZONTAL DEFLECTION DEVICE

Filed July 20, 1965

INVENTORS
YUSUKE ITAGAKI
TAKASHI ANDO

BY Carty + Carty
ATTORNEYS

United States Patent Office 3,403,290

Patented Sept. 24, 1968

3,403,290

HORIZONTAL DEFLECTION DEVICE

Yusuke Itagaki, Ota-shi, and Takashi Ando, Gunma-ken, Japan, assignors to Sanyo Electric Co., Ltd., Moriguchi-shi, Japan, a corporation of Japan Filed July 20, 1965, Ser. No. 473,298

Claims priority, application Japan, Apr. 7, 1965, 40/20,692

2 Claims. (Cl. 315—27)

ABSTRACT OF THE DISCLOSURE

The disclosure describes a horizontal deflection circuit for a television receiver employing transistors. Two transistors are used, the collector current of the first transistor flowing directly into the emitter of the second transistor. The first transistor is operated with the emitter grounded and the second transistor is operated with the base grounded.

This invention relates to horizontal deflection output circuits in television receivers and more particularly to a novel switching circuit for supplying saw tooth current to the horizontal deflection coil of a television receiver. More specifically, the present invention intends to provide a switching system which permits the use of germanium power transistors of low cost and is composed of a combination of at least two such power transistors.

Transistors when used as a switching device in a horizontal deflection circuit of a television receiver are superior to vacuum tubes because of their theoretically high efficiency and reliability in performance. For a satisfactory switching operation by a single transistor, however, the transistor must simultaneously satisfy several requirements and these requirements become more severe as the cathode ray tube of greater size is used. This leads to a difficulty of mass production of such transistors, which therefore require a high cost of manufacture, and to a difficulty of obtaining a horizontal deflection output circuit at an economical price. As a remedy for the above problem, it is proposed to connect two transistors having nearly equal characteristics in parallel or in series and to cause the transistors to simultaneously operate. But troubles due to unbalance in the operation of the two transistors are more or less unavoidable and this method can not always assure a reliable operation.

It is therefore the primary object of the present invention to provide improvements in the horizontal deflection circuit heretofore well known in the art and at the same time to provide a switching circuit of entirely novel structure.

According to one feature of the present invention, two transistors of different characteristics are made to cooperate with each other in a compatible way to deal with various severe requirements on the power transistor characteristics in order to thereby solve transistor destruction problems which may be encountered in the practical operation and to assure reliable and positive performance of the switching circuit.

According to another feature of the present invention, an ordinary type of transistors commonly found in the market can satisfactorily be employed to form the switching circuit and thus price economy in respect of transistors can be attained.

The above and other objects, advantages and features of the present invention will become apparent from the following description with reference to the accompanying drawings, in which.

Basically, the horizontal deflection circuit according to the invention includes a hybrid connection of two transistors. The first transistor to which a switching signal is applied is so designed as to have a short switching time while having a relatively low breakdown voltage. On the other hand, the second transistor connected to the first transistor is so designed as to have a high breakdown voltage. The first and the second transistors are adapted to operate with emitter-grounded and base-grounded connection, respectively. The collector current of the first transistor flows directly into the emitter of the second transistor, thus the collector current of the second transistor is switched by a switching signal applied to the base of the first transistor. The second transistor has a longer switching time than the first transistor when both are compared with each other in terms of emitter-grounded operation. This drawback of the second transistor having such a long switching time, however, does not adversely affect the switching characteristics of the system because this transistor is operated with base-grounded connection and because the switching time in the case of base-grounded transistor operation is much shorter than that in the case of emitter-grounded operation. This manner of connection of the second transistor effectively eliminates any reverse effect on the switching speed of the hybrid connection system, that is, a tendency towards lowering of the switching speed, and the second transistor thus serves as a blocking means against the high voltage generated in the deflecting coil. In addition to these advantages, the base-grounded operation favors better thermal stability and enlarges the stable operation region of the second transistor. The above-described circuit including the hybrid connection of two transistors solves the difficulties involved in the conventional transistorized deflection circuits.

Figure 1:
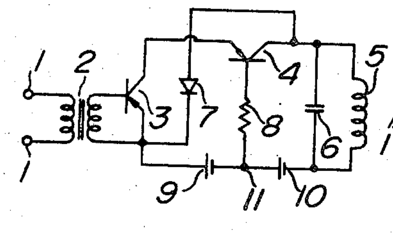
FIG. 1 is a circuit diagram showing the basic principle of the present invention.

The present invention will be described in more detail with reference to the drawings. Referring first to FIG. 1 showing the basic principle of the present invention, terminals 1,1 connected to the output stage of a horizontal drive transistor (not shown) are connected to the primary winding of an input transformer 2. The secondary winding of the input transformer 2 is connected between the base and the emitter of first transistor 3. The collector of first transistor 3 is connected to the emitter of second transistor 4, and at the same time a horizontal deflection coil 5 and a condenser 6 are connected in parallel with the collector of second transistor 4. The circuit of FIG. 1 also includes a damper diode 7, a base resistor 8 and power sources 9 and 10. The diode 7 is connected between the emitter of first transistor 3 and the collector of second transistor 4, while the base resistor 8 is connected between the base of second transistor 4 and a junction 11 of the voltage supply sources 9 and 10.

Switching operation of the circuit of FIG. 1 will now be described. When a switching signal supplied from the driving stage through the input transformer 2 is applied to the base-emitter terminal of first transistor 3, the first transsistor 3 is driven to its on condition and the collector current of the first transistor 3 flows directly into the emitter of second transistor 4 so that the collector current of the second transistor 4 is switched by the switching signal applied to the base of first transistor 3. In this case, current $I_{BON}$ flowing through the base of second transistor 4 is given by $$I_{BON}=E_2/R_B$$

where $E_2$ is a source voltage at 9, $R_B$ is a resistance value of the base resistor 8.

If the current $I_{BON}$ is large enough to drive the second transistor 4 into its on condition, the above output circuit is closed and a deflecting current as expressed by the $$I_{Dy}=\frac{1}{L_{Dy}}(E_1+E_2)t$$

where, $I_{Dy}$=deflecting current in amperes flowing through the deflecting coil 5;

$L_{Dy}$=inductance in microhenries of the deflecting coil 5;

$E_1$ and $E_2$=voltages in volts at supply sources 10 and 9, respectively; and $t$=time in microseconds elapsed after the transistor 4 has been driven to its on condition.

In such circuit, the current of saw tooth waveform flowing through the deflecting coil 5 is produced by the cooperation of the transistors 3 and 4 and the damper diode 7.

The horizontal deflection circuit according to the present invention is made inoperative in the following manner. The first transistor 3 is driven to its off condition when an off-signal is applied to the base-emitter terminal of first transistor 3. However, the charges stored in the base region of second transistor 4 flow out through the base resistor 8 until they are finally extinguished. After the charges stored in the base region of second transistor 4 have been removed, the switching circuit takes its completely inoperative or off condition. Then, the flyback voltage generated by the deflecting coil 5 and the condenser 6 is applied across the base-collector terminal of second transistor 4.

Figure 3:
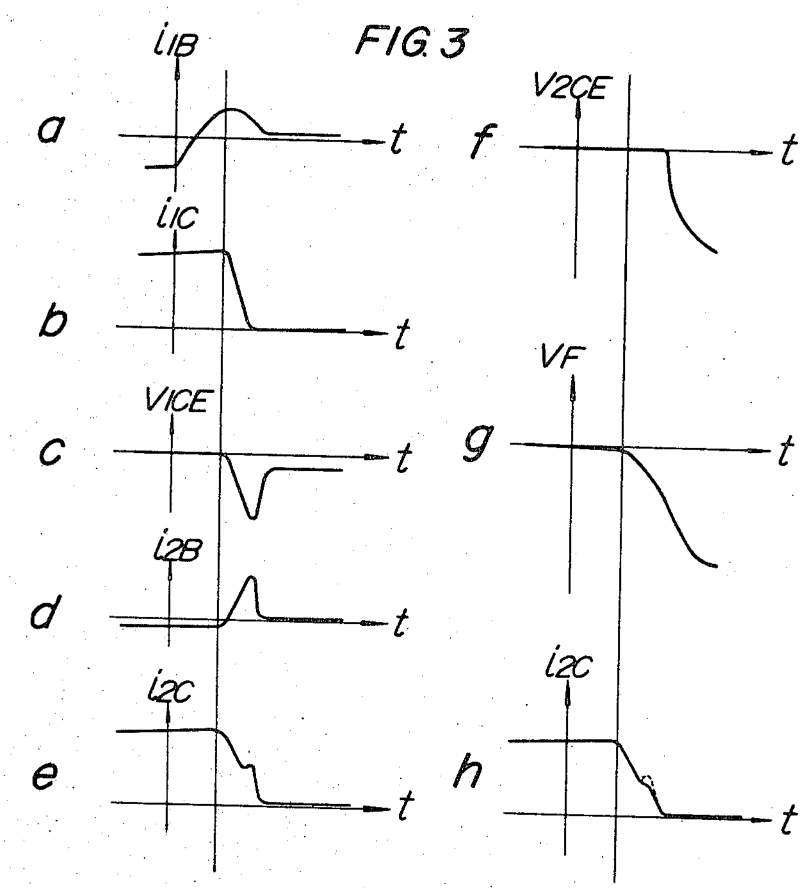
FIG. 3 is a schematic illustration of voltage and current waveforms at various parts of the switching circuit according to the present invention.

In *a* to *g* of FIG. 3, there are shown various current and voltage waveforms developed during the off condition of the circuit according to the invention. In FIG. 3, *a* and *b* represent base and collector current waveforms in the first transistor 3, respectively; *c*, emitter-to-collector voltage waveform in the first transistor 3; *d* and *e*, base and collector current waveforms in the second transistor 4, respectively; *f*, emitter-to-collector voltage waveform in the second transistor 4; and *g*, flyback voltage waveform generated across the base-collector terminal of second transistor 4.

Figure 2:
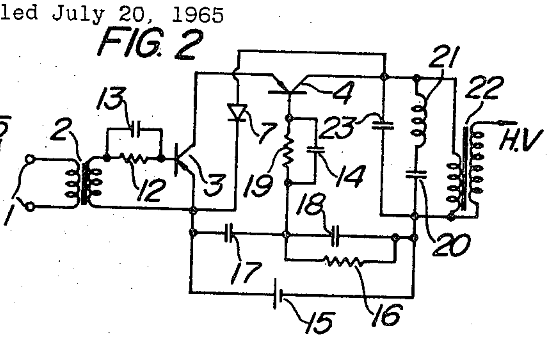
FIG. 2 is a circuit diagram showing a preferred embodiment of the present invention.

A practical circuit diagram according to the present invention is illustrated in FIG. 2, in which same reference numerals are used to designate similar parts appearing in FIG. 1. In FIG. 2, speed-up condensers 13 and 14 are inserted in respective base circuits of a first and a second transistor 3 and 4 in order to rapidly remove the charges stored in the bases of respective transistors 3 and 4. The practical circuit diagram of FIG. 2 differs from the basic circuit diagram of FIG. 1 in its method of supplying source voltage. Or more precisely, the voltage sources 9 and 10 in FIG. 1 are replaced by a single voltage source 15. This method can provide an inexpensive circuit although it entails a disadvantage of power loss. The value of a by-pass condenser 16 may suitably be selected so that desired voltage drop is given by base current $I_{BON}$. In *h* of FIG. 3, there is shown the effect of the speed-up condenser 14 on the decay characteristics of collector current $I_c$ of second transistor 4. Solid and dotted curves in the collector current waveform in *h* represent the results obtained with and without the speed-up condenser 14, respectively. It will be seen that, with the speed-up condenser 14, the collector current $I_c$ of second transistor 4 makes substantially linear decay during the off-condition of the second transistor 4. The circuit of FIG. 2 includes a base resistance 12 for the first transistor 3 and high-frequency by-pass condensers 17 and 18. Further, a resistor 19 is provided in the base circuit of second transistor 4 to apply, together with the resistor 16, a predetermined bias voltage across the emitter-base junction of second transistor 4. A condenser 20 is connected in series with a horizontal deflecting coil 21. A condenser 23 is connected in parallel with the primary winding of an output transformer 22, and a boosted high voltage is induced in the secondary winding of the transformer for supply to the high voltage portion of the cathode ray tube. The resistors 16 and 19, and the voltage at supply source 15 in the above circuit have their constants suitably set at predetermined values so that predetermined bias voltages can be applied across the emitter-collector junction of first transistor 3 and the emitter-base junction of second transistor 4 and so that the first transistor 3 and the second transistor 4 can thereby properly operate.

Preferred values of the circuit components of FIG. 2 are as follows:

| | | |
|---|---|---|
| Condenser **13** | μf | 2 |
| Resistor **12** | Ω | 3.3 |
| First transistor **3** | | TG–17 |
| Second transistor **4** | | TG–18 |
| Damper diode **7** | | TG–14 |
| Resistor **19** | Ω | 10 |
| Condenser **14** | μf | 0.06 |
| Condenser **17** | μf | 1000 |
| Condenser **18** | μf | 1000 |
| Condenser **23** | μf | 0.05 |
| Condenser **20** | μf | 6 |
| Source voltage **15** | v | 24 |

As described above, the present invention is applicable to a horizontal deflection circuit of television receivers. In order to obtain a great deflection power, it is generally necessary that transistors used in such circuit are power transistors which per se have a high α cutoff frequency as well as a large current capacity and an excellent reverse withstand-voltage property. However, an effort to improve the reverse withstand-voltage property of the transistor without any regard to its current capacity will result in the lowering of its α cutoff frequency. Heretofore, transistors having similar reverse withstand-voltage properties and α cutoff frequencies have been connected in parallel or series to obtain a great deflection power. In the prior circuit arrangement, these transistors have been used in an emitter-grounded fashion, which has resulted in a prolonged switching time and in an impossibility of using transistors having a low α cutoff frequency. Therefore, limitation in the withstand-voltage property of these transistors has caused corresponding limitation in the deflection power.

The present invention eliminates these drawbacks involved in the prior system and provides an improved deflection circuit in which one of transistors is used in a base-grounded fashion so that the circuit can have an improved switching time characteristic and can withstand a high voltage. According to the present invention, a transistor having a high α cutoff frequency and a relatively low breakdown voltage, that is, one having a short switching time characteristic, and a transistor having a low α cutoff frequency and a high breakdown voltage, that is, one having a long switching time characteristic, are used in an emitter-grounded and a base-grounded fashion, respectively, so that high voltage can be applied across the collector-base terminal of the base-grounded transistor to thereby protect the transistors from the high voltage generated during the switching operation.

What is claimed is:

1. A horizontal deflection device in a television receiver comprising a first emitter-grounded transistor having base, emitter and collector, a second base-grounded transistor having its emitter connected with the collector of said first transistor, a deflecting coil connected with the collector of said second transistor, means for applying a predetermined biasing potential across the emitter-base terminal of said second transistor, damper means connected with the collector of said second transistor, and means for applying a control signal across the base-emitter terminal of said first transistor, said first and second transistors and said damper means being cooperatively responsive to the control signal to supply a saw tooth current to said deflecting coil.

2. A horizontal deflection device in a television receiver comprising a first transistor having a relatively low breakdown voltage, a second transistor having a relatively high breakdown voltage and having its emitter connected with the collector of said first transistor, an input circuit connected between the base and the emitter of said first transistor for supplying a control signal across the base-emitter terminal of said first transistor, a deflecting coil connected with the collector of said second transistor, means for applying a predetermined biasing potential across the base-emitter terminal of said second transistor, and damper means connected with the collector of said second transistor, said first and second transistors and said damper means being cooperatively responsive to the control signal applied across the base-emitter terminal of said first transistor to thereby supply a saw tooth current to said deflecting coil.

References Cited

UNITED STATES PATENTS 3,157,817 11/1964 Shimada ------------ 315—27

RODNEY D. BENNETT, *Primary Examiner.*

R. E. BERGER, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,403,290 September 24, 1968

Yusuke Itagaki et al.

It is certified that error appears in the above identified patent and that said Letters Patent are hereby corrected as shown below:

In the heading to the printed specification, after line 8, insert -- July 22, 1964, 39/58,496 --. Column 3, line 59, "by-pass condenser" should read -- resistor --.

Signed and sealed this 10th day of March 1970.

(SEAL)

Attest:

Edward M. Fletcher, Jr.

Attesting Officer

WILLIAM E. SCHUYLER, JR.

Commissioner of Patents